United States Patent
Kelley

(10) Patent No.: US 10,214,407 B2
(45) Date of Patent: Feb. 26, 2019

(54) SYSTEMS FOR COOLING HOT-FILLED CONTAINERS

(71) Applicant: GRAHAM PACKAGING COMPANY, L.P., York, PA (US)

(72) Inventor: Paul V. Kelley, Wrightsville, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 623 days.

(21) Appl. No.: 14/846,452

(22) Filed: Sep. 4, 2015

(65) Prior Publication Data

US 2015/0375884 A1 Dec. 31, 2015

Related U.S. Application Data

(63) Continuation of application No. 12/916,570, filed on Oct. 31, 2010, now Pat. No. 9,133,006.

(51) Int. Cl.
| | |
|---|---|
| *B67C 3/14* | (2006.01) |
| *B67C 3/22* | (2006.01) |
| *B67C 7/00* | (2006.01) |

(52) U.S. Cl.
CPC .................. *B67C 7/00* (2013.01); *B67C 3/14* (2013.01); *B65B 2220/24* (2013.01); *B65G 2201/0261* (2013.01); *B67C 2003/226* (2013.01)

(58) Field of Classification Search
CPC .. B67C 3/045; B67C 3/14; B67C 3/24; B67C 7/00; B67C 2003/226; B65B 7/2835; B65B 63/08; B65B 2220/24; B65G 17/32; B65G 2201/0261
USPC ......... 53/127, 281; 198/803.3, 803.8, 803.14
See application file for complete search history.

(56) References Cited

U.S. PATENT DOCUMENTS

| | | |
|---|---|---|
| 1,499,239 A | 6/1924 | Malmquist |
| 1,919,811 A | 7/1933 | Stonebraker |
| D110,624 S | 7/1938 | Mekeel, Jr. |
| 2,124,959 A | 7/1938 | Vogel |
| 2,142,257 A | 1/1939 | Saeta |
| 2,378,324 A | 6/1945 | Don Ray et al. |
| 2,880,902 A | 4/1959 | Owsen |

(Continued)

FOREIGN PATENT DOCUMENTS

| | | |
|---|---|---|
| AU | 2002257159 B2 | 3/2007 |
| CA | 2077717 A1 | 3/1993 |

(Continued)

OTHER PUBLICATIONS

U.S. Appl. 12/916,570 (U.S. Pat. No. 9,133,006), filed Oct. 31, 2010 (Sep. 15, 2015).

(Continued)

*Primary Examiner* — Stephen F. Gerrity
(74) *Attorney, Agent, or Firm* — Baker Botts L.L.P.

(57) ABSTRACT

Systems and methods using container holders configured to provide a stable support for containers held therein in order to efficiently cool the containers after a hot-fill or elevated temperature operation. The container holders can allow a fluid to pass from an inner volume of the container holder to outside the container holder through side apertures and/or an open bottom end of the container holder. Groups of containers and container holders also may be cooled. Groups of containers in container holders can be processed through the cooling operation at a speed different from a speed for holderless containers.

13 Claims, 15 Drawing Sheets

(56) References Cited

U.S. PATENT DOCUMENTS

| | | |
|---|---|---|
| 2,960,248 A | 11/1960 | Kuhlman |
| 2,971,671 A | 2/1961 | Shakman |
| 2,982,440 A | 5/1961 | Harrison |
| 3,043,461 A | 7/1962 | Glassco |
| 3,081,002 A | 3/1963 | Tauschinski et al. |
| 3,090,478 A | 5/1963 | Stanley |
| 3,142,371 A | 7/1964 | Rice et al. |
| 3,174,655 A | 3/1965 | Hurschman |
| 3,198,861 A | 8/1965 | Marvel |
| 3,301,293 A | 1/1967 | Santelli |
| 3,325,031 A | 6/1967 | Singier |
| 3,390,891 A * | 7/1968 | Stichhan ............... B65B 3/16 269/254 R |
| 3,397,724 A | 8/1968 | Bolen et al. |
| 3,409,167 A | 11/1968 | Blanchard |
| 3,417,893 A | 12/1968 | Lieberman |
| 3,426,939 A | 2/1969 | Young |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,819,789 A | 6/1974 | Parker |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor, Jr. |
| 3,942,673 A | 3/1976 | Lyu et al. |
| 3,949,033 A | 4/1976 | Uhlig |
| 3,956,441 A | 5/1976 | Uhlig |
| 4,036,926 A | 7/1977 | Chang |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,158,624 A | 6/1979 | Ford et al. |
| 4,170,622 A | 10/1979 | Uhlig et al. |
| 4,174,782 A | 11/1979 | Obsomer |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla et al. |
| 4,381,061 A | 4/1983 | Cerny et al. |
| 4,386,701 A | 6/1983 | Galer |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,497,855 A | 2/1985 | Agrawal et al. |
| 4,525,401 A | 6/1985 | Pocock et al. |
| 4,542,029 A | 9/1985 | Caner et al. |
| D269,158 S | 5/1986 | Gaunt et al. |
| 4,610,366 A | 9/1986 | Estes et al. |
| 4,628,669 A | 12/1986 | Herron et al. |
| 4,640,406 A * | 2/1987 | Willison ............... B65G 17/323 198/377.03 |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,723,661 A | 2/1988 | Hoppmann et al. |
| 4,724,855 A | 2/1988 | Jackson et al. |
| 4,747,507 A | 5/1988 | Fitzgerald et al. |
| 4,749,092 A | 6/1988 | Sugiura et al. |
| 4,769,206 A | 9/1988 | Reymann et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Cassidy et al. |
| 4,836,398 A | 6/1989 | Leftault, Jr. et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,958,667 A * | 9/1990 | Rece et al. ............ B65B 3/16 198/803.8 |
| 4,962,863 A | 10/1990 | Wendling et al. |
| 4,967,538 A | 11/1990 | Leftault, Jr. et al. |
| 4,978,015 A | 12/1990 | Walker |
| 4,997,692 A | 3/1991 | Yoshino |
| 5,004,109 A | 4/1991 | Bartley et al. |
| 5,005,716 A | 4/1991 | Eberle |
| 5,014,868 A | 5/1991 | Wittig et al. |
| 5,024,340 A | 6/1991 | Alberghini et al. |
| 5,033,254 A | 7/1991 | Zenger |
| 5,060,453 A | 10/1991 | Alberghini et al. |
| 5,067,622 A | 11/1991 | Garver et al. |
| 5,090,180 A | 2/1992 | Sorensen |
| 5,092,474 A | 3/1992 | Leigner |
| 5,122,327 A | 6/1992 | Spina et al. |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood |
| 5,217,737 A | 6/1993 | Gygax et al. |
| 5,234,126 A | 8/1993 | Jonas et al. |
| 5,244,082 A * | 9/1993 | Togashi ............... B67C 3/24 198/803.11 |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,310,043 A | 5/1994 | Alcorn |
| 5,333,761 A | 8/1994 | Davis et al. |
| 5,341,946 A | 8/1994 | Valliencourt et al. |
| 5,392,937 A | 2/1995 | Prevot et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,543,107 A | 8/1996 | Malik et al. |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,651,941 A * | 7/1997 | Stark et al. ............ B01L 9/06 220/676 |
| 5,672,730 A | 9/1997 | Cottman |
| 5,687,874 A | 11/1997 | Omori et al. |
| 5,690,244 A | 11/1997 | Darr |
| 5,704,504 A | 1/1998 | Bueno |
| 5,713,480 A | 2/1998 | Petre et al. |
| 5,730,314 A | 3/1998 | Wiemann et al. |
| 5,730,914 A | 3/1998 | Ruppman, Sr. |
| 5,735,420 A | 4/1998 | Nakamaki et al. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |

(56) References Cited

U.S. PATENT DOCUMENTS

| | | |
|---|---|---|
| 5,785,197 A | 7/1998 | Slat |
| 5,819,507 A | 10/1998 | Kaneko et al. |
| 5,829,614 A | 11/1998 | Collette et al. |
| 5,860,556 A | 1/1999 | Robbins, III |
| D405,192 S | 2/1999 | Smith et al. |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D415,030 S | 10/1999 | Searle et al. |
| 5,971,184 A | 10/1999 | Krishnakumar et al. |
| 5,976,653 A | 11/1999 | Collette et al. |
| RE36,639 E | 4/2000 | Okhai |
| 6,065,624 A | 5/2000 | Steinke |
| 6,068,110 A | 5/2000 | Kumakiri et al. |
| 6,074,596 A | 6/2000 | Jacquet |
| 6,077,554 A | 6/2000 | Wiemann et al. |
| 6,105,815 A | 8/2000 | Mazda |
| 6,135,015 A * | 10/2000 | Mendez ............... B65B 55/14 426/397 |
| 6,213,325 B1 | 4/2001 | Cheng et al. |
| 6,217,818 B1 | 4/2001 | Collette et al. |
| 6,228,317 B1 | 5/2001 | Smith et al. |
| 6,230,912 B1 | 5/2001 | Rashid |
| 6,277,321 B1 | 8/2001 | Vailliencourt et al. |
| 6,298,638 B1 | 10/2001 | Bettle |
| 6,343,690 B1 * | 2/2002 | Britton et al. ........ B65G 17/002 198/803.6 |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |
| 6,467,639 B2 | 10/2002 | Mooney |
| 6,485,669 B1 | 11/2002 | Boyd et al. |
| 6,502,369 B1 | 1/2003 | Andison et al. |
| 6,514,451 B1 | 2/2003 | Boyd et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,662,960 B2 | 12/2003 | Hong et al. |
| 6,749,780 B2 | 6/2004 | Tobias |
| 6,763,968 B1 | 7/2004 | Boyd et al. |
| 6,769,561 B2 | 8/2004 | Futral et al. |
| 6,779,673 B2 | 8/2004 | Melrose et al. |
| 6,923,334 B2 | 8/2005 | Melrose et al. |
| 6,942,116 B2 | 9/2005 | Lisch et al. |
| 6,971,506 B2 * | 12/2005 | Hassinen et al. ...... G01N 35/04 198/803.14 |
| 6,983,858 B2 | 1/2006 | Slat et al. |
| 7,051,073 B1 | 5/2006 | Dutta |
| 7,051,889 B2 | 5/2006 | Boukobza |
| D522,368 S | 6/2006 | Darr et al. |
| 7,073,675 B2 | 7/2006 | Trude |
| 7,077,279 B2 | 7/2006 | Melrose |
| 7,137,520 B1 | 11/2006 | Melrose |
| 7,150,372 B2 | 12/2006 | Lisch et al. |
| 7,159,364 B2 | 1/2007 | Rillie |
| 7,543,713 B2 | 6/2009 | Trude et al. |
| 7,574,846 B2 * | 8/2009 | Sheets et al. ........ B65D 1/0261 198/803.8 |
| 7,735,304 B2 | 6/2010 | Kelley et al. |
| 7,799,264 B2 | 9/2010 | Trude |
| 8,011,166 B2 * | 9/2011 | Sheets et al. ........ B65D 1/0261 198/803.8 |
| 8,662,580 B2 * | 3/2014 | Henke et al. .......... B60N 3/101 297/188.14 |
| 2001/0035391 A1 | 11/2001 | Young et al. |
| 2002/0074336 A1 | 6/2002 | Silvers |
| 2002/0096486 A1 | 7/2002 | Bourque |
| 2002/0153343 A1 | 10/2002 | Tobias et al. |
| 2002/0158038 A1 | 10/2002 | Heisel et al. |
| 2003/0015491 A1 | 1/2003 | Melrose et al. |
| 2003/0057176 A1 * | 3/2003 | Kitterman et al. ...... B65B 7/168 215/351 |
| 2003/0110736 A1 * | 6/2003 | Boyd ...................... B65B 3/18 53/440 |
| 2003/0186006 A1 | 10/2003 | Schmidt et al. |
| 2003/0196926 A1 | 10/2003 | Tobias et al. |
| 2003/0217947 A1 | 11/2003 | Ishikawa et al. |
| 2004/0016716 A1 | 1/2004 | Melrose et al. |
| 2004/0074864 A1 | 4/2004 | Melrose et al. |
| 2004/0149677 A1 | 8/2004 | Slat et al. |
| 2004/0173565 A1 | 9/2004 | Semersky et al. |
| 2004/0211746 A1 | 10/2004 | Trude |
| 2005/0207945 A1 * | 9/2005 | Itoh ..................... B01L 9/06 422/562 |
| 2005/0211662 A1 | 9/2005 | Eaton et al. |
| 2006/0006133 A1 | 1/2006 | Lisch et al. |
| 2006/0138074 A1 | 6/2006 | Melrose |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |
| 2007/0017892 A1 | 1/2007 | Melrose |
| 2007/0045312 A1 | 3/2007 | Abercrombie, III et al. |
| 2007/0051073 A1 | 3/2007 | Kelley et al. |
| 2007/0084821 A1 | 4/2007 | Bysick et al. |
| 2007/0101681 A1 * | 5/2007 | Iwashita et al. ........ B67C 7/00 53/425 |
| 2007/0125742 A1 | 6/2007 | Simpson, Jr. et al. |
| 2007/0125743 A1 | 6/2007 | Pritchett, Jr. et al. |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |
| 2008/0156847 A1 | 7/2008 | Hawk et al. |
| 2009/0202766 A1 | 8/2009 | Beuerle et al. |
| 2009/0218003 A1 * | 9/2009 | Miyazaki et al. ...... B67C 3/045 141/4 |
| 2009/0293436 A1 * | 12/2009 | Miyazaki et al. ...... B67C 3/045 53/471 |
| 2010/0012462 A1 * | 1/2010 | Cerf ..................... B65G 47/088 198/434 |

FOREIGN PATENT DOCUMENTS

| | | | |
|---|---|---|---|
| DE | 1134609 B * | 8/1962 | ............... B67C 3/14 |
| DE | 1761753 B1 | 1/1972 | |
| DE | P2102319.8 | 8/1972 | |
| DE | 3215866 A1 | 11/1983 | |
| DE | 3322596 A1 * | 7/1984 | ............... B67C 3/24 |
| EP | 225155 A2 | 6/1987 | |
| EP | 0346518 A1 | 12/1989 | |
| EP | 0521642 A1 | 1/1993 | |
| EP | 0551788 A1 | 7/1993 | |
| EP | 0666222 A1 | 8/1995 | |
| EP | 0609348 B1 | 2/1997 | |
| EP | 0916406 A2 | 5/1999 | |
| EP | 0957030 A2 | 11/1999 | |
| EP | 1063076 A1 | 12/2000 | |
| FR | 335421 A * | 1/1904 | ............... B67C 3/24 |
| FR | 1571499 A | 6/1969 | |
| FR | 2607109 A1 | 5/1988 | |
| GB | 781103 A | 8/1957 | |
| GB | 1113988 A | 5/1968 | |
| GB | 2050919 A | 1/1981 | |
| GB | 2372977 A | 9/2002 | |
| JP | 48-31050 | 9/1973 | |
| JP | 49-28628 B1 | 7/1974 | |
| JP | 54-72181 A | 6/1979 | |
| JP | 56-72730 U | 6/1981 | |
| JP | 57-37827 U | 2/1982 | |
| JP | 57-210829 A | 12/1982 | |
| JP | 63-189224 A | 8/1988 | |
| JP | 3-43342 A | 2/1991 | |
| JP | 03-076625 A | 4/1991 | |
| JP | 5-193694 A | 8/1993 | |
| JP | 6-336238 A | 12/1994 | |

(56) References Cited

FOREIGN PATENT DOCUMENTS

| | | | |
|---|---|---|---|
| JP | 07-300121 A | 11/1995 | |
| JP | 8-253220 A | 10/1996 | |
| JP | 8-282633 A | 10/1996 | |
| JP | 09-039934 A | 2/1997 | |
| JP | 9-110045 A | 4/1997 | |
| JP | 10-167226 A | 6/1998 | |
| JP | 10-181734 A | 7/1998 | |
| JP | 10-230919 A | 9/1998 | |
| JP | 11-218537 A | 8/1999 | |
| JP | 2000-229615 | 8/2000 | |
| JP | 2002-127237 A | 5/2002 | |
| JP | 2004-026307 A | 1/2004 | |
| JP | 2006-501109 A | 1/2006 | |
| JP | 2007-216981 A | 8/2007 | |
| NZ | 240448 A | 6/1995 | |
| NZ | 296014 A | 10/1998 | |
| NZ | 335565 A | 10/1999 | |
| NZ | 506684 | 9/2001 | |
| NZ | 512423 | 9/2001 | |
| NZ | 521694 | 10/2003 | |
| WO | WO 93/009031 A1 | 5/1993 | |
| WO | WO 93/012975 A1 | 7/1993 | |
| WO | WO 94/005555 A1 | 3/1994 | |
| WO | WO 97/003885 A1 | 2/1997 | |
| WO | WO 97/014617 A1 | 4/1997 | |
| WO | WO 97/034808 A1 | 9/1997 | |
| WO | WO 99/021770 A1 | 5/1999 | |
| WO | WO 00/38902 A1 | 7/2000 | |
| WO | WO 00/051895 A1 | 9/2000 | |
| WO | WO 01/040081 A1 | 6/2001 | |
| WO | WO 02/002418 A1 | 1/2002 | |
| WO | WO 02/018213 A1 | 3/2002 | |
| WO | WO 02/085755 A1 | 10/2002 | |
| WO | WO 04/028910 A1 | 4/2004 | |
| WO | WO 04/106176 A2 | 9/2004 | |
| WO | WO 04/106175 A1 | 12/2004 | |
| WO | WO 05/012091 A2 | 2/2005 | |
| WO | WO 2005070815 A1 * | 8/2005 | B67C 3/14 |
| WO | WO 05/087628 A1 | 9/2005 | |
| WO | WO 2005115908 A1 * | 12/2005 | B67C 3/045 |
| WO | WO 06/113428 A2 | 10/2006 | |
| WO | WO 07/127337 A2 | 11/2007 | |

OTHER PUBLICATIONS

U.S. Appl. No. 12/916,570, Aug. 11, 2015 Issue Fee Payment.
U.S. Appl. 12/916,570, May 11, 2015 Notice of Allowance.
U.S. Appl. 12/916,570, Jan. 5, 2015 Response to Non-Final Office Action.
U.S. Appl. 12/916,570, Oct. 3, 2014 Non-Final Office Action.
U.S. Appl. 12/916,570, Jun. 6, 2014 Request for Continued Examination (RCE).
U.S. Appl. 12/916,570, Apr. 7, 2014 Amendment and Request for Continued Examination (RCE).
U.S. Appl. 12/916,570, Mar. 6, 2014 Advisory Action.
U.S. Appl. 12/916,570, Feb. 11, 2014 Applicant Initiated Interview Summary.
U.S. Appl. 12/916,570, Feb. 6, 2014 Response after Final Office Action.
U.S. Appl. 12/916,570, Dec. 6, 2013 Final Office Action.
U.S. Appl. 12/916,570, Aug. 9, 2013 Response to Non-Final Office Action.
U.S. Appl. 12/916,570, May 9, 2013 Non-Final Office Action.
U.S. Appl. No. 12/916,570, Nov. 20, 2012 Response to Restriction Requirement.
U.S. Appl. 12/916,570, Oct. 26, 2012 Restriction Requirement.
"Application and Development of PET Plastic Bottle," Publication of Tsinghad Tongfang Optical Disc Co. Ltd., Issue 4, 2000, p. 41. (No English language translation available).
Chanda, M. & Roy, Salil K., Plastics Technology Handbook, 2007, CRC Press, pp. 2-34-2-37.
International Search Report for PCT/US2004/024581 dated Jul. 25, 2005.
International Search Report for PCT/US2005/008374 dated Aug. 2, 2005.
IPRP (including Written Opinion) for PCT/US2004/024581 dated Jan. 30, 2006.
IPRP (including Written Opinion) for PCT/US2005/008374 dated Sep. 13, 2006.

* cited by examiner

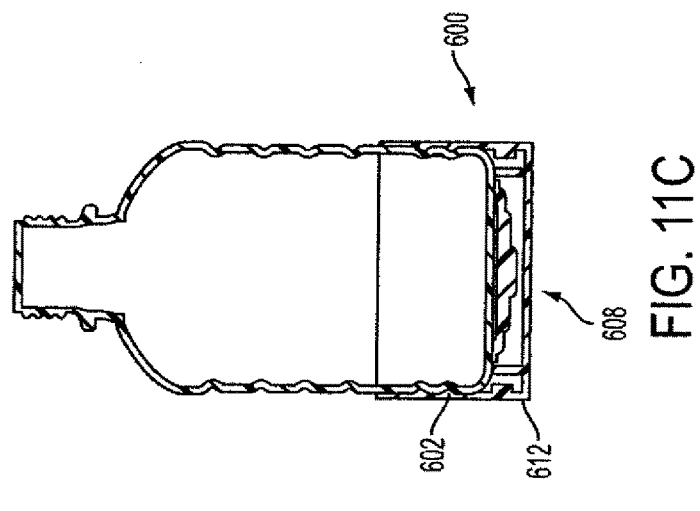
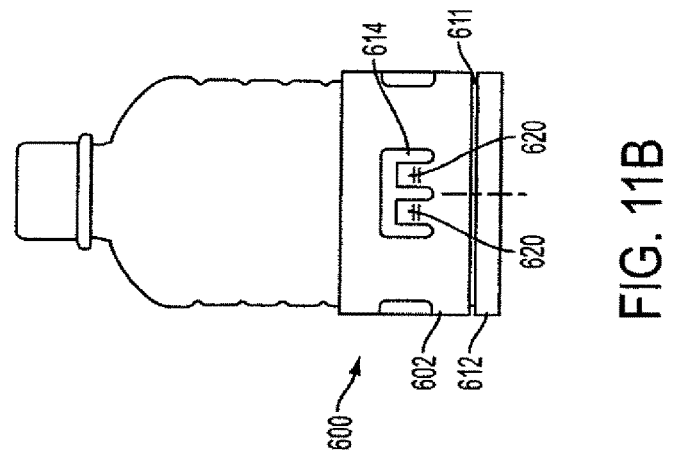
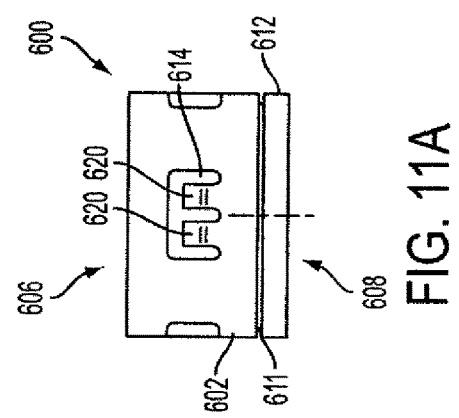

SYSTEMS FOR COOLING HOT-FILLED CONTAINERS

CROSS-REFERENCE TO RELATED APPLICATIONS

This application is a divisional of U.S. patent application Ser. No. 12/916,570 filed Oct. 31, 2010, which is incorporated by reference herein in its entirety

BACKGROUND OF THE INVENTION

Field of the Invention

The disclosed subject matter generally relates to cooling hot-filled containers. In particular, the disclosed subject matter involves cooling hot-filled containers using a container holder. Further, the disclosed subject matter also relates to container processing at different speeds, namely, processing the containers at a first speed when container holders are used and at a second speed when container holders are not used.

SUMMARY OF THE INVENTION

Embodiments of the disclosed subject matter are directed generally to systems, methods, and apparatuses for cooling hot-filled containers. As used herein, the phrase "various embodiments" is intended to mean an embodiment, at least one embodiment, some embodiments, and/or all embodiments without limitation.

Various embodiments of the disclosed subject matter are directed to a container holder, comprising: a cylindrical sidewall forming an inner volume, a first open end, and a second open end; a base portion formed in one piece with said cylindrical sidewall at the second open end, said base portion extending from said cylindrical sidewall into the inner volume and including a hollow cylindrical portion concentric with said cylindrical sidewall and a plurality of connecting portions coupling said hollow cylindrical portion to said cylindrical sidewall; and a plurality of slanted protrusions formed in one piece with said cylindrical sidewall, said protrusions extending into the inner volume at acute angles from said cylindrical sidewall and being configured to space-apart from the cylindrical sidewall a container placed in the inner volume. The cylindrical sidewall includes a plurality of apertures formed therein, each said aperture being configured to allow fluid to flow from the inner volume to the outside of the cylindrical sidewall to cool the container placed in the inner volume.

Optionally, each said protrusion includes a cut-away portion, said cut-away portion being configured to prevent the container placed in the inner volume from being removed from the inner volume. In various embodiments, the angles of said protrusions are substantially the same for each protrusion. Optionally, a number of the plurality of protrusions is the same as a number of the plurality of apertures. In various embodiments, the plurality of protrusions are fins, each said fin including a cut-away portion configured to prevent the container placed in the inner volume from being removed from the inner volume. In various embodiments, each said aperture is elongated in a direction parallel to a longitudinal axis of said cylindrical sidewall. In various embodiments, said base portion is configured to allow access to a vacuum panel of the container placed in the inner volume.

Various embodiments of the disclosed subject matter also include an apparatus, comprising: at least one sidewall forming an inner volume, a first open end, and a second open end, the at least one sidewall including fluid transfer means for transferring fluid between the inner volume and outside the inner volume, the fluid transfer means located intermediate the first and second ends; supporting means for supporting a container positioned thereon, said supporting means being formed integrally with the at least one sidewall at the second open end, so as to extend from the at least one sidewall into the inner volume; and spacing means for spacing the container positioned on said supporting means from the at least one sidewall.

In various embodiments, said spacing means includes retaining means for retaining the plastic container within inner volume. Further, in various embodiments, the fluid transfer means is configured to allow water to flow from the inner volume to the outside of the sidewall to cool a container placed in the inner volume on said supporting means.

Various embodiments of the disclosed subject matter include a system for processing plastic containers, comprising: hot-filling means for hot-filling a plurality of plastic containers with a product; capping means for capping the hot-filled plastic containers; placing means for placing the plastic containers on respective container holding means for holding the plastic containers; positioning means for positioning said container holding means having respective hot-filled and capped plastic containers placed thereon, such that each said container holding means is in contact with at least three other of said container holding means, and such that each plastic container is in a spaced-apart relationship with all other of the positioned plastic containers; and cooling means for cooling the hot-filled product in the positioned plastic containers from a hot state to a predetermined warm state. In various embodiments, each said container holding means includes: at least one sidewall forming an inner volume, a first open end, and a second open end, the at least one sidewall including fluid transfer means for transferring fluid between the inner volume and outside the inner volume; container supporting means for supporting the plastic container positioned thereon, said container supporting means being formed in one piece with the at least one sidewall at the second open end, so as to extend from the at least one sidewall into the inner volume; and spacing means for spacing the plastic container positioned on said container supporting means from the at least one sidewall. Optionally, the hot state is about 185 degrees Fahrenheit and the predetermined warm state is about 100 degrees Fahrenheit. In various embodiments, a time period for the hot-filled product to cool from the hot state to the predetermined warm state is about fourteen minutes to about eighteen minutes. In various embodiments, said cooling includes subjecting the hot-filled and capped plastic containers to room temperature water. Optionally, said subjecting to room temperature water lasts for no more than about eighteen minutes. In various embodiments, said cooling includes subjecting the hot-filled and capped plastic containers to water cooler than room temperature. Optionally, said subjecting to water cooler than room temperature lasts for no more than about eighteen minutes. In various embodiments, the fluid transfer means is configured to allow water to flow from the inner volume to the outside of the sidewall to assist in the cooling.

In various embodiments, the system can further comprise inverting means for inverting a projection extending from each of the cooled plastic containers. The cooling can create a vacuum in the plastic container, and inverting the projection extending from the cooled plastic container is performed to one of substantially removes the vacuum and creates an overpressure in the plastic container.

A method of cooling groups of hot-filled containers, comprising: a step for hot-filling a plurality of plastic containers with a product; a step for capping the hot-filled plastic containers; a step for placing the plastic containers on respective container holders; a step for forming a plurality of groups from the plurality of plastic containers and associated container holders, each said group including at least two of said plastic containers and associated container holders; for each group, a step for positioning the container holders having respective hot-filled and capped plastic containers placed thereon, such that each container holder is in contact with other container holders of said group, and such that each plastic container of the group is in a spaced-apart relationship with all other of said plastic containers in the group; and a step for successively conveying each said group of positioned, hot-filled, and capped plastic containers in container holders through room temperature water, such that the hot-filled product in the containers is cooled from a hot state to a warm state.

In various embodiments, the plurality of plastic containers and associated container holders is seven, and said positioning further includes positioning, at a center position, one of the container holders and associated plastic container; and positioning the remaining six container holders and associated plastic containers of said seven, such that the remaining six container holders surround, and are in contact with, the centrally positioned container holder. Optionally, the seven container holders are banded together by a band configured to be placed around, and in contact with, the six container holders that surround the centrally positioned container holder. In various embodiments, the hot state is about 185 degrees Fahrenheit and the warm state is about 100 degrees Fahrenheit. In various embodiments, a time period for the hot-filled product to cool from the hot state to the warm state is about fourteen minutes to about eighteen minutes. In various embodiments, said conveying each said group through room temperature water lasts for no more than about eighteen minutes.

For the foregoing method, in various embodiments each said container holder can include: a cylindrical sidewall forming an inner volume, a first open end, and a second open end; a base portion formed in one piece with the cylindrical sidewall at the second open end, said base portion extending from the cylindrical sidewall into the inner volume, including a hollow cylindrical portion concentric with the cylindrical sidewall and a plurality of connecting portions coupling the hollow cylindrical portion to the cylindrical sidewall; and a plurality of protrusions formed in one piece with the cylindrical sidewall, each said protrusion extending at an angle from the sidewall into the inner volume, wherein the cylindrical sidewall includes a plurality of apertures formed therein.

Various embodiments of the disclosed subject matter can also include a method of cooling liquid in bottles from a hot state to a warm state within eighteen minutes, the method comprising conveying hot bottles through room temperature water in pucks for no more than eighteen minutes, wherein the pucks provide for spacing apart of the hot bottles with respect to one another. Optionally, the hot state is about 185 degrees Fahrenheit and the warm state is about 100 degrees Fahrenheit. In various embodiments, said conveying includes conveying the hot bottles through room temperature water in pucks for about fourteen minutes.

Various embodiments of the disclosed subject matter also involve a method of processing containers at different speeds, depending upon whether or not container holders are used, the method comprising automatically, autonomously, and electronically determining whether a first container or group of containers has corresponding container holders and performing cooling operations for the container or containers with holders at a first speed or rate, otherwise performing cooling operations for the container or containers without holders at a second speed or rate, the first speed being greater than the second speed. The method can further comprise automatically switching between the different speeds or rates depending upon whether a container with a holder or a container without a holder is detected.

BRIEF DESCRIPTION OF THE DRAWINGS

The accompanying drawings, which are incorporated in and constitute a part of this specification, illustrate embodiments of the disclosed subject matter. The disclosed subject matter will be best understood by reading the ensuing specification in conjunction with the drawing figures, in which like elements are designated by like reference numerals, and wherein:

FIG. 11A is a side view of the container holder of FIG. 6.

FIG. 11B is a side view of the container holder of FIG. 6 with a container placed therein.

FIG. 11C is a cross sectional view of FIG. 11B.

DETAILED DESCRIPTION

The disclosed subject matter generally relates to cooling hot-filled containers. In particular, the disclosed subject matter involves cooling hot-filled containers using a container holder. Further, the disclosed subject matter also relates to container processing at different speeds, namely, processing the containers at a first speed when container holders are used and at a second speed when container holders are not used.

The container for use with container holders, systems, and methods according to various embodiments of the disclosed subject matter can take any suitable shape and can be made from any suitable material, including, but not limited to, plastic, glass, rubber, etc. Moreover, the container can be filled with any suitable product, including, but not limited to, carbonated beverages, non-carbonated beverages, water, tea, sports drinks, etc. Additionally, the product can be filled into the container at any suitable temperature, including, but not limited to, a hot-fill, a warm-fill, a room temperature-fill, cold fill, etc. In various embodiments, the product can be hot-filled into the container at any suitable temperature. For example, the temperature of a hot product filled in container can be at a temperature of about 185 degrees Fahrenheit.

Container holders according to various embodiments of the disclosed subject matter can be any suitable apparatus configured to hold and/or support a container or containers. For example, container holders according to various embodiments of the disclosed subject matter can include fin type, a snap type, non-snap type non-fin type, puck type, tray type, basket type, etc. Container holders according to various embodiments of the disclosed subject matter can be any suitable shape and size, such as, but not limited to a square, a cylinder, etc., and can be made of any suitable material, including, but not limited to, plastic, metal, rubber, etc. Additionally, the container holder 100 can be made by any suitable process, including, but not limited to, injection molding, blow molding, compression molding, etc.

A container holder according various embodiments of the disclosed subject matter will now be described with respect to FIGS. 1-5.

Figure 1:
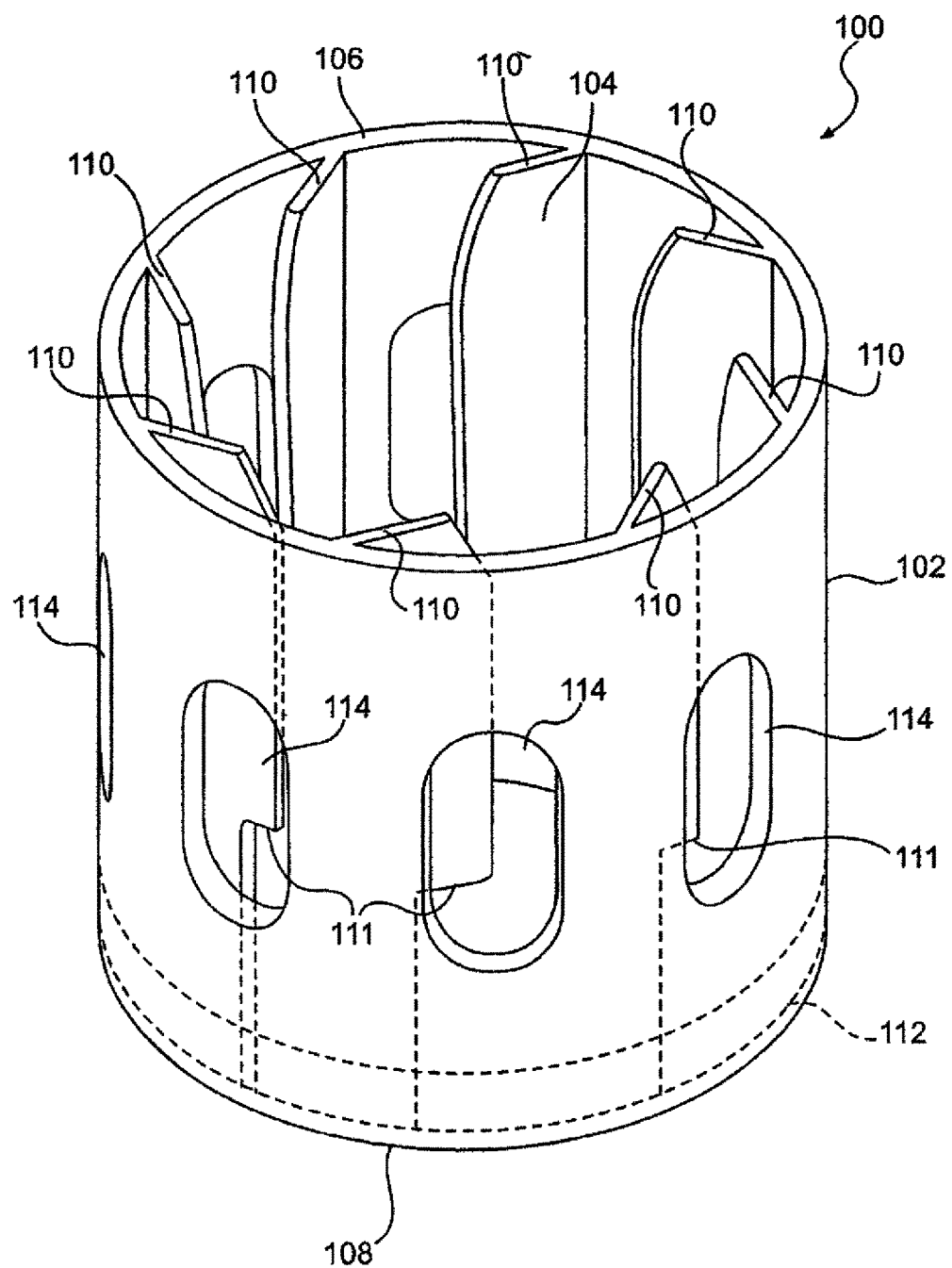
FIG. 1 is a perspective view of a container holder according to various embodiments of the disclosed subject matter.

FIG. 1 shows a fin type container holder 100 according to various embodiments.

Container holder 100 according to various embodiments of the disclosed subject matter can be used to hold and/or support a container or containers for any suitable purpose. For example, in various embodiments, the container holder 100 can be used to hold and/or support a container as the container is subjected to a cooling process. The container holder 100 also may be used to hold and/or support a container or containers with a movable bottom end portion, that is inverted to take-up the vacuum and/or create an overpressure in the container. In various embodiments, the projection can extend through a portion of the container holder 100. Alternatively, the projection can project inward from the container base and can be moved further inward.

Figure 2:
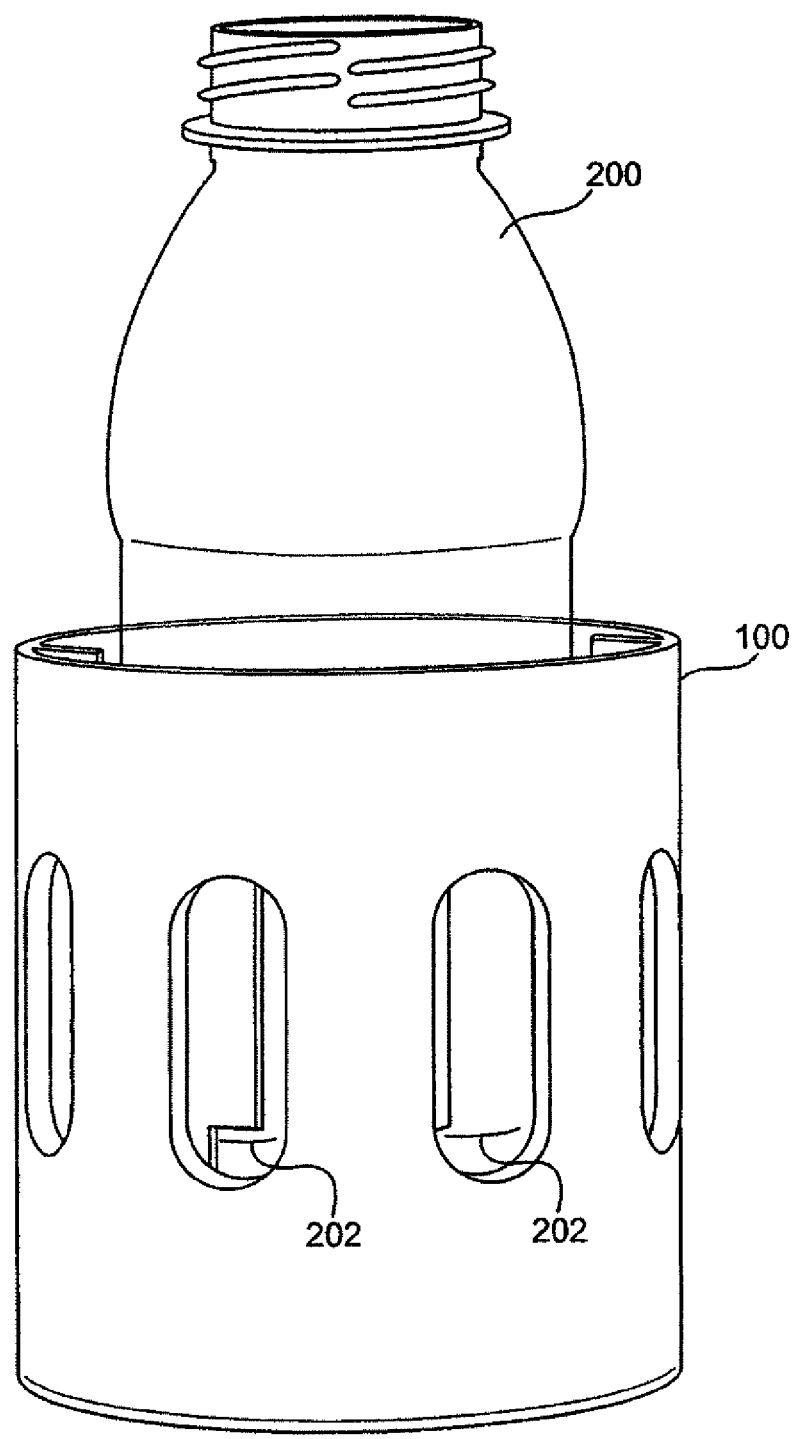
FIG. 2 is a perspective view of a container holder having a container placed therein according to various embodiments of the disclosed subject matter.

FIG. 2 shows a container holder 100 according to various embodiments having positioned therein a container 200.

As shown in FIG. 2, the container 200 is positioned in the inner volume 104 of container holder 100. Container 200 can be of any suitable size and shape. In various embodiments, container 200 can include one or more rib 202. As will be described in detail later, the one or more rib 202 may be positioned below a cut-away portion 111 of the protrusions 110 when the container 200 is positioned in the container holder 100. In various embodiments, the cut-away portion 111 may prevent the container 200 from being removed from the container holder 100 by engaging the one or more rib 202. Moreover, a predetermined force may be required to disengage the one or more rib 202 from the cut-away portion 111.

Figure 3:
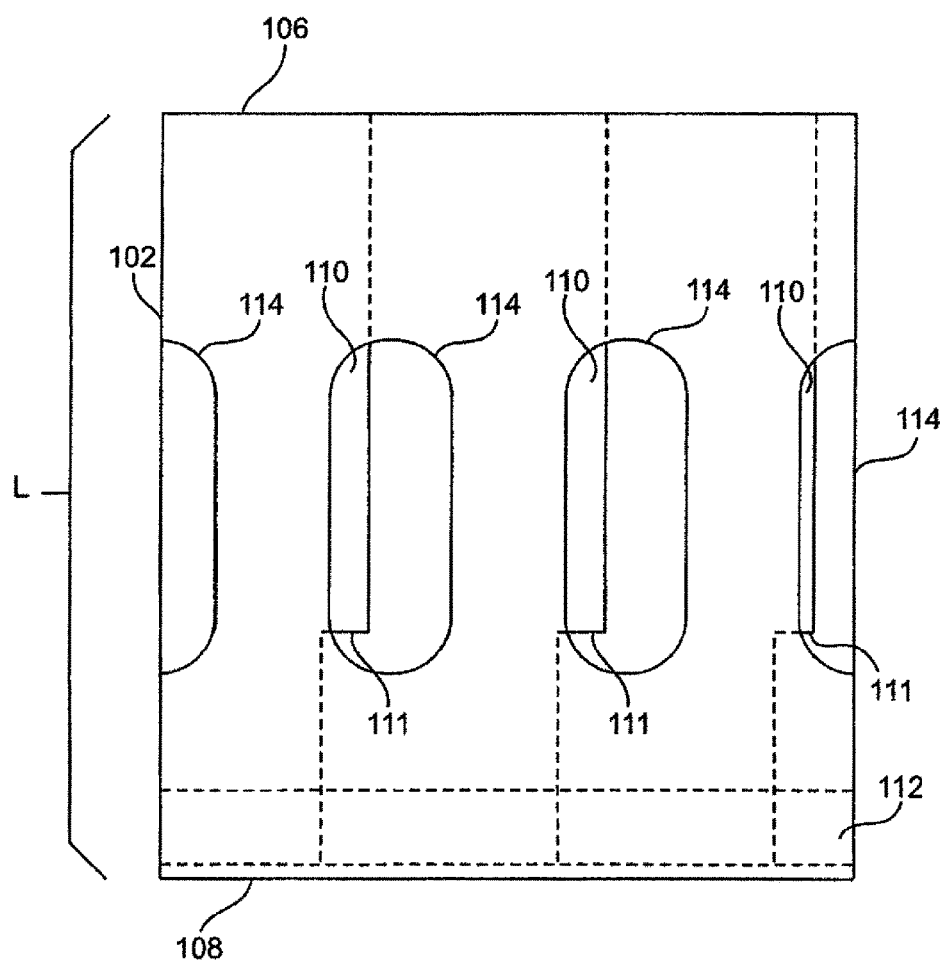
FIG. 3 is a side view of a container holder according to various embodiments of the disclosed subject matter.

Turning back to FIG. 1, which shows a perspective view of container holder 100 and turning to FIG. 3, which shows a side view of container holder 100, these figures show that container holder 100 can include at least one sidewall 102, a base portion 112, and a plurality of protrusions 110.

The at least one sidewall 102 can be of any suitable shape and size, including, but not limited to, a hollow cylindrical member having a length L sized to cover a portion of the sidewall of a container 200 placed therein.

In addition, at least one sidewall 102 may form an inner volume 104, a first open end 106, and a second open end 108.

In various embodiments, the at least one sidewall 102 can include a plurality of apertures 114 formed therein. First open end 106 can be sized so that container 200 can be positioned on base portion 112, which may be at the second open end 108.

Apertures 114 can be any suitable size and shape, and of any suitable number. For example, as shown in FIGS. 1 and 3, apertures 114 can be elongated in a direction parallel to a central longitudinal axis of the at least one sidewall 102. Furthermore, apertures 114 may have rounded ends. In various embodiments, apertures 114 may be configured to allow the transfer of fluid from inner volume 104 to outside the inner volume. The fluid can be any suitable fluid or fluids, including, but not limited to air, water, etc. In various embodiments the transfer of fluid from inner volume 104 to outside the inner volume can cool a container 200 placed in the inner volume 104, on base portion 112.

Base portion 112, the outer diameter of which is represented by the horizontal dashed lines in FIGS. 1 and 3, can be configured to support a container 200 positioned thereon. Base portion 112 can be of any suitable configuration and can be configured at any suitable location. In various embodiments, base portion 112 can be coupled to the at least one sidewall 102 in the inner volume 104, so as to extend inward from the at least one sidewall into the inner volume 104. For example, base portion 112 can be formed in one piece with the at least one sidewall 102 by injection molding or blow molding techniques. Moreover, base portion 112 can be positioned at or close to second open end 108 (as can be seen by the dashed horizontal lines).

Figure 4:
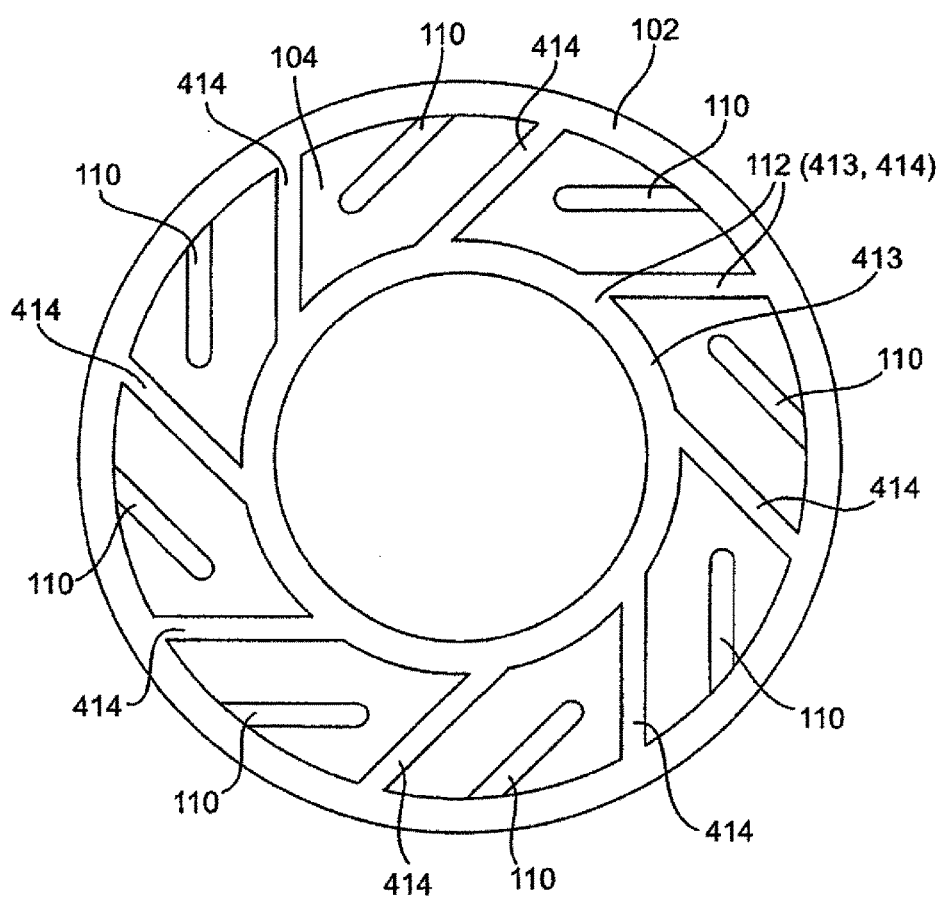
FIG. 4 is a bottom view of container holder according to various embodiments of the disclosed subject matter.

FIG. 4 shows a bottom view of container holder 100. Base portion 112 may include a hollow portion 413 and a plurality of connecting portions 414. Hollow portion 413 can be of any suitable configuration and shape, including, but not limited to, annular, cylindrical, etc. Connecting portions 414 may couple hollow portion 413 to the at least one sidewall 102. In various embodiments, hollow portion 413 may be configured to allow access to a vacuum panel or protrusion at the bottom of a container 200 placed thereon. For example, hollow portion 413 may be configured to allow an actuator to pass through its center to modify or move a bottom portion of the container 200. Additionally, the actuator may invert a projection of the container 200 to reduce a vacuum and/or create an overpressure in the container 200. In various embodiments, the vacuum may be created by cooling the container 200. In addition, base portion 112 can be configured to allow fluid, such as water and/or air to pass from the inner volume 104 to outside the inner volume 104.

Protrusions 110 can be of any suitable material, including the same material as sidewall 102 and/or base portion 112. In various embodiments, protrusions 110 can be formed in one piece with sidewall 102, and can extend into the inner volume 104. Also, protrusions 110 can be of any suitable configuration and at any suitable position. In various embodiments, the protrusions 110 can be substantially planar and extend substantially in a vertical direction with respect to the length of the sidewall 102 from first open end 106 to second open end 108 (shown by dashed vertical lines in FIGS. 1 and 3). Additionally, as can be seen from FIG. 4, protrusions 110 can extend from sidewall 102 into inner volume 104 at angles.

The angles of the protrusions 110 can be any suitable angle, and the angles can be all substantially the same, all different, or some the same and some different. For example, though FIG. 4 shows the angles being substantially the same, each of the protrusions 110 can be at angles that are different from angles of other protrusions 110. Any suitable number of protrusions 110 can be provided. In various embodiments, the number of protrusions 100 can be the same as the number of apertures 114. Protrusions 110 can be configured for any suitable purpose. In various embodiments, protrusions 110 can be configured to space-apart from sidewall 102 a container placed in the inner volume 104.

Figure 5:
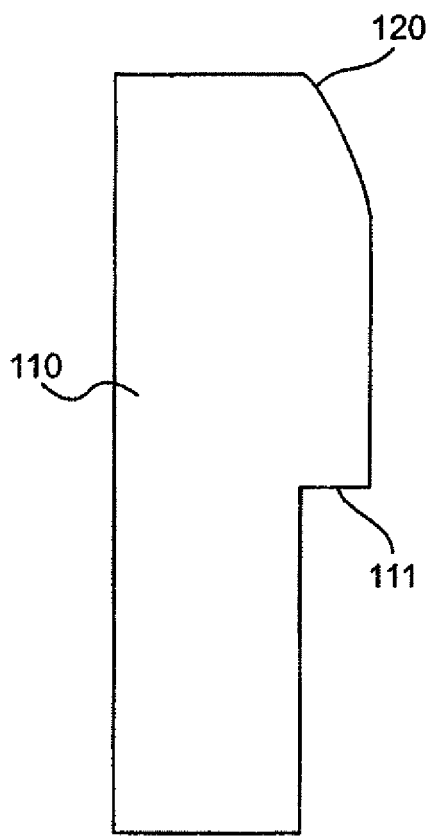
FIG. 5 is a profile view of a protrusion of a container holder according to various embodiments of the disclosed subject matter.
Figure 6:
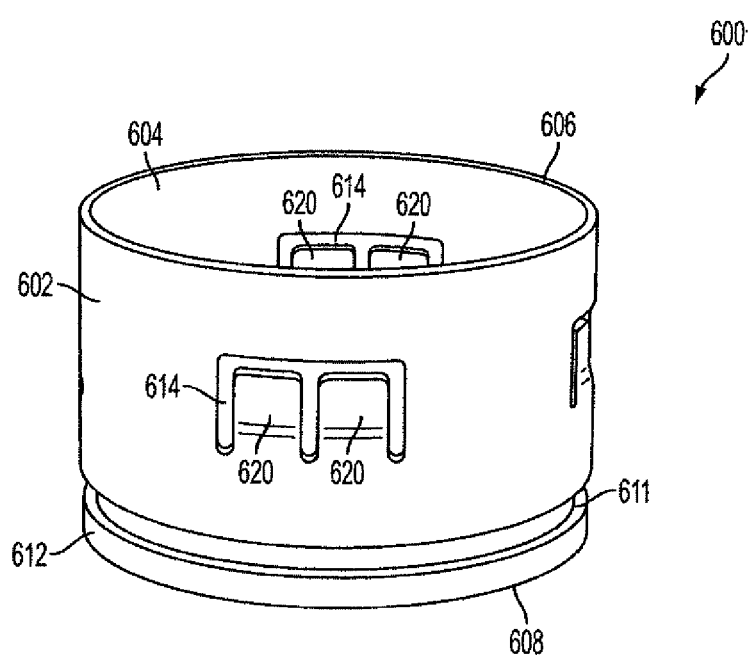
FIG. 6 is a perspective view of a snap-fit container holder according to various embodiments of the disclosed subject matter.
Figure 7:
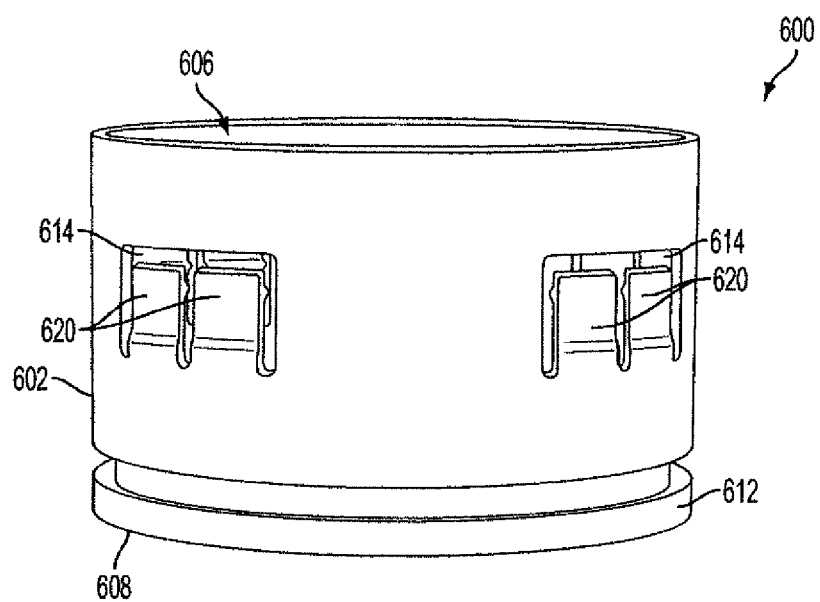
FIG. 7 is a side perspective view of the container holder of FIG. 6.

Protrusions 110 can be of any suitable shape and configuration, including, but not limited to, fins. As shown in FIG. 5, in various embodiments, protrusion 110 can include a sloped portion 120 and a cut-away portion 111. In addition, protrusions 110 can be configured for any suitable purpose and/or function. In various embodiments, protrusions 110 may be configured to frictionally engage any suitable portion of a container 200 placed into the inner volume 104 and/or onto base portion 112. In various embodiments, protrusions 110 may frictionally engage container 200 such that the container is secured in the container holder 100. For example, the vertically configured portion of protrusion 110 (between sloped portion 120 and cut-away portion 111) may frictionally engage the sidewall of the container 200 to secure the container 200 in the container holder 100.

Sloped portion 120 can be of any suitable configuration, can be at any suitable location on protrusion 110, and can be configured for any suitable purpose. In various embodiments, sloped portion 120 can be configured to facilitate the registration and/or placement of container 200 into the inner volume 104 and onto base portion 112.

Cut-away portion 111 can be of any suitable configuration. As can be seen from FIG. 5, in various embodiments, the cut-away portion 111 may extend from a bottom portion of the protrusion 110. Moreover, cut-away portion 111 can be configured for any suitable purpose and/or function. In various embodiments, cut-away portion 111 can be configured to engage any suitable portion of the container 200. For example, when container 200 is substantially fully seated in container holder 100, on base portion 112, cut-away portion 111 may be positioned above one or more rib 202 of container 200. The cut-away portion 111 may prevent the container 200 from being removed from the container holder 100 by engaging the one or more rib 202. Moreover, a predetermined force, such as a predetermined upward force, may be required to disengage the one or more rib 202 from the cut-away portion 111 so the container 200 can be removed from the container holder 100.

FIGS. 6-11C relate to a snap-fit container holder 600 according to various embodiments of the disclosed subject matter.

Container holder 600 can include a sidewall 602, a base portion 612, a plurality of vertically extending protrusions 620 in the sidewall 602, and a plurality of apertures 614 in the sidewall 602. The sidewall 602 can be of any suitable shape and size, including, but not limited to, a hollow cylindrical member having a length sized to cover a portion of a sidewall of a container placed therein (see, e.g., FIGS. 11B and 11C). Sidewall 602 may define an inner volume 604, a first open end 606, and a second open end 608. First open end 606 can be sized to accommodate a container's width so that the container can be inserted therethrough in an upright position. Second open end 608 can be defined by the base portion 612, and base portion 612 is configured so the container can rest in an upright position thereon.

Base portion 612 can be of any suitable configuration. In various embodiments, base portion 612 can be coupled to the sidewall 602 by way of an optional intermediate portion 611. Intermediate portion may be solid, or, optionally, it may have apertures, slits or slots, for example. Such apertures may assist with egress of fluids (e.g., water) from the holder 600 and thus the container during a cooling operation. Egress of fluid from the holder 600 also assists with eliminating storage of fluid within the holder 600, which can tend to make the holder heavier during processing.

Figure 8:
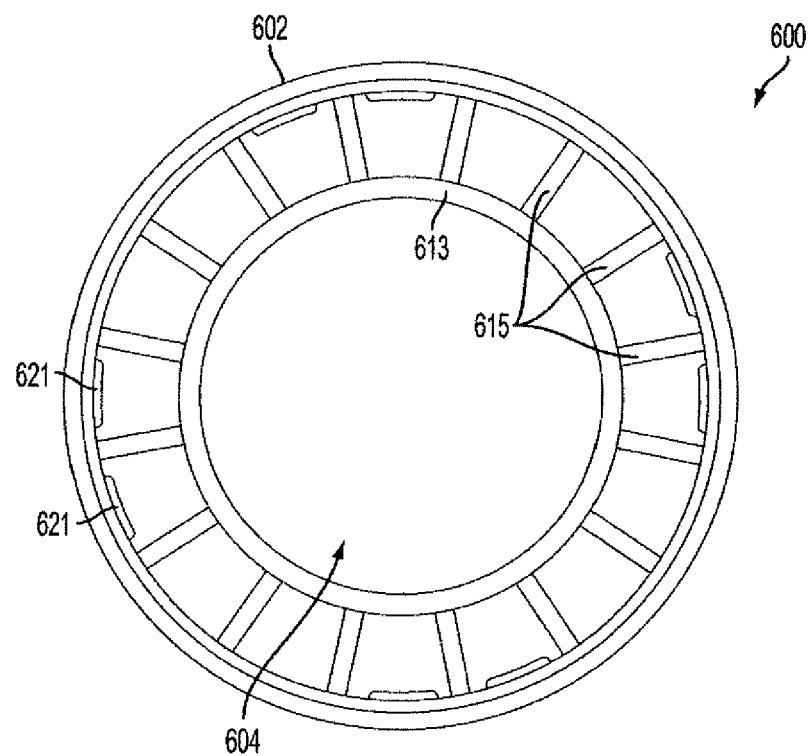
FIG. 8 is an overhead view of the container of FIG. 6.
Figure 9:
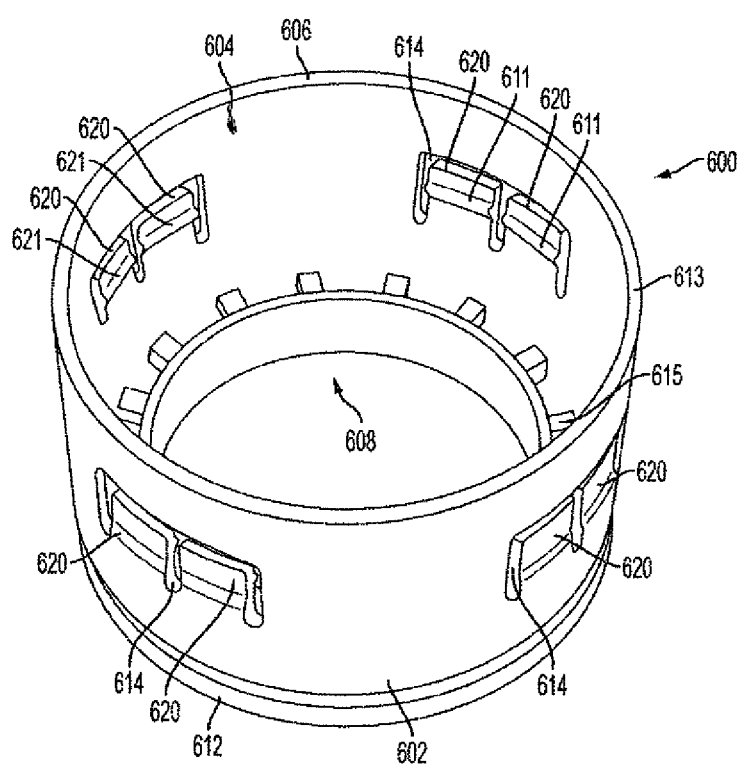
FIG. 9 is an overhead perspective view of the container holder of FIG. 6.

FIG. 8 shows an overhead view of container holder 600. Base portion 612 may include a hollow portion 613 and a plurality of connecting portions 615. Hollow portion 613 can be of any suitable configuration and shape, including, but not limited to, annular, cylindrical, ring, etc. Connecting portions 615 may couple hollow portion 613 to the sidewall 602. In various embodiments, hollow portion 615 may be configured to allow access to a vacuum panel, movable portion, or protrusion at the bottom of a container placed on the base portion 612. For example, hollow portion 613 may be configured to allow an actuator to pass through its center to modify or move a bottom portion of the container. For example, the actuator may invert a projection of the container to reduce a vacuum and/or create an overpressure in the container. In addition, base portion 112 can be configured to allow fluid, such as water and/or air to pass from the inner volume 604 to outside the inner volume 604 by way of the second open end 608, for example through the voids between the connecting portions 615 and/or the internal void created by the hollow portion 613.

Apertures 614 can be any suitable size and shape, and of any suitable number. Each aperture 614 may define one or more vertically extending protrusions 620. FIGS. 6-11C show two vertically extending protrusions 620 for each aperture 614, but various embodiments of the disclosed subject matter may have only one or three vertically extending protrusions 614. In various embodiments, apertures 614 may be configured to allow the transfer of fluid from inner volume 604 to outside the inner volume (i.e., outside the container). The fluid can be any suitable fluid or fluids, including, but not limited to air, water, etc. In various embodiments the transfer of fluid from inner volume 604 to outside the inner volume can cool a container placed in the inner volume 604, on base portion 612.

Vertically extending protrusions 620 can be of any suitable shape, size, orientation, or number. Incidentally, though FIGS. 6-11C show the vertically extending protrusions 620 extending upward, the vertically extending protrusions may extend downward. As such, the corresponding aperture 614 would be rotated by 180 degrees, for example.

Vertically extending protrusions 620 can be of any suitable material, including the same material as sidewall 602 and/or base portion 612. In various embodiments, vertically extending protrusions 620 can be formed in one piece with sidewall 602. Optionally, as will be discussed below, each vertically extending protrusion 620 may itself have an inwardly protruding portion which can extend into the inner volume 604.

Vertically extending protrusions 620 can be configured for any suitable purpose and/or function. In various embodiments, vertically extending protrusions 620 may be configured to frictionally engage any suitable portion of a container placed into the inner volume 604 and/or onto base portion 612. In various embodiments, vertically extending protrusions 620 may frictionally engage container such that the container is secured in the container holder 600. Furthermore, vertically extending protrusions 620 can be configured to retain or assist with retaining a container placed in the holder 600. For example, container holder 600 is a snap fit holder, and, as such, vertically extending protrusions 620 can be configured to receive and retain the container in snap fit fashion. In various embodiments, the configuration (e.g., geometry, position, orientation, etc.) vertically extending protrusions 620 can be based on a specific container or containers for use with the holder 600. Optionally, the configuration of the vertically extending protrusions 620 can be generic in the sense that they can be used with numerous container configurations.

Though FIGS. 6-11C show all of the vertically extending protrusions 620 being the same configuration, some or all of the vertically extending protrusions 620 may be different configurations.

Figure 10A:
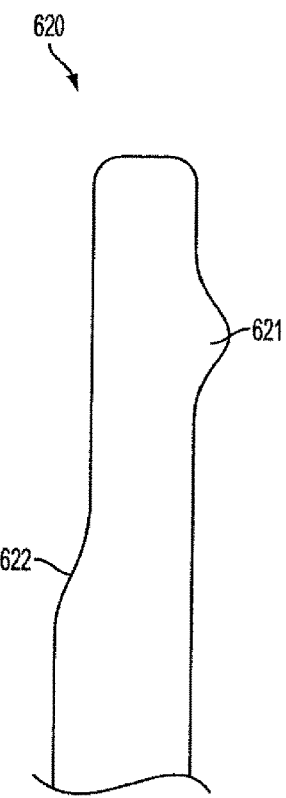
FIGS. 10A, 10B, and 10C show profile views of retainer members for use with container holder of FIG. 6 according to various embodiments of the disclosed subject matter.
Figure 10B:
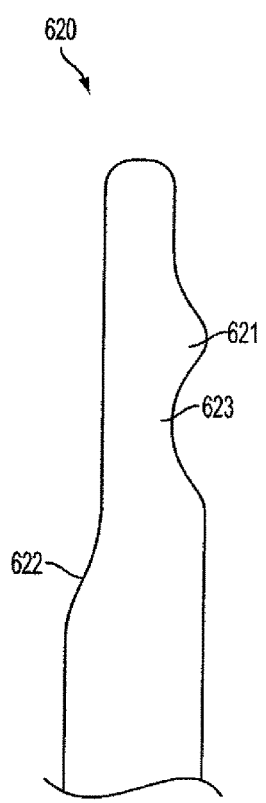
Figure 10C:
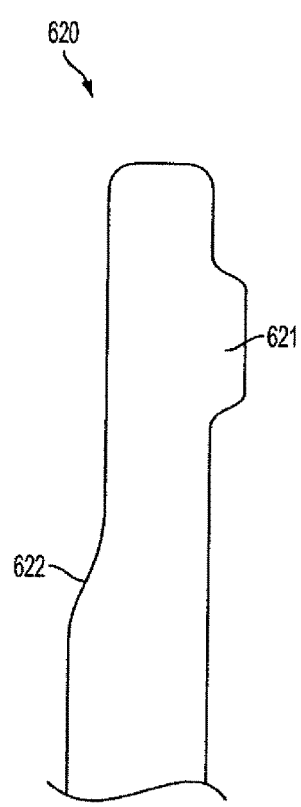

FIGS. 10A, 10B, and 10C show profile views of exemplary vertically extending protrusions 620 for use with container holder 600 according to various embodiments of the disclosed subject matter.

The example vertically extending protrusions 620 can have a horizontally protruding portion 621. In various embodiments, the horizontally protruding portion may extend into the inner volume 604 of the holder 600. Further, the horizontally protruding portion 621 may be configured based on a configuration of a container to be held by the holder 600. In various embodiments, in the embodiment shown in FIG. 108, for example, the vertically extending protrusions 620 may include a recess 623. Recess 623 also may be configured to mate with a certain container configuration. For example, a protrusion of the container may seat within the recess 623. Various embodiments of the vertically extending protrusion 620 can also include an angled portion 622. Angled portion 622 can create an inward bias as the container is inserted into the holder 600. Thus, the angled portion 622 can assist with retaining the container in the holder 600.

As shown in FIG. 11C, a container may be positioned in the inner volume 604 of container holder 600. Container can be of any suitable size and shape. In various embodiments, container can include one or more ribs. As will be described in detail later, the one or more ribs may be positioned within the container holder 600 so as to frictionally engage the vertically extending protrusion 620. For example, a rib of the container may be positioned below a horizontally extending protrusion 621 of the vertically extending protrusion 620. Thus, the vertically extending protrusion 620 and specifically the horizontally extending protrusion 621 in this particular embodiment may prevent the container from being removed from the container holder 600 by engaging a corresponding rib. Moreover, a predetermined force may be required to disengage the rib from the vertically extending protrusion 620. Though each of the vertically extending protrusion 620 is shown with a horizontal protrusion 621, various embodiments of the vertically extending protrusions 620 may not have a horizontally extending protrusion 621, and, instead have only a recess 632 for engaging the container. Incidentally, FIG. 110 shows a container in holder 600 having a movable bottom portion that is projecting downward from its base into an area of the intermediate portion 611. As discussed earlier, the projection may be pushed upward, into the container body to compensate an internal vacuum of the container.

Figure 12:
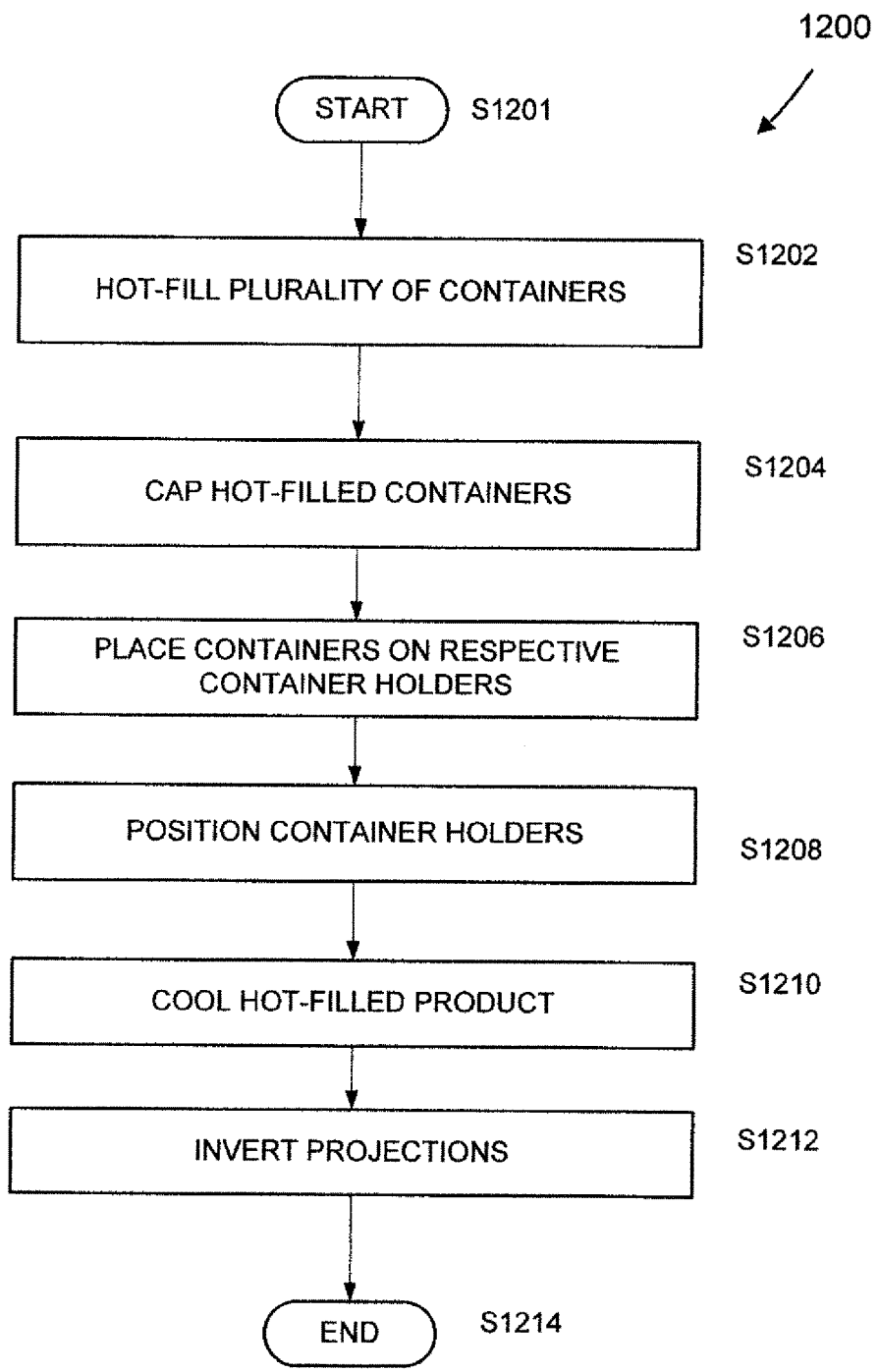
FIG. 12 is a flow chart of a method according to various embodiments of the disclosed subject matter.
Figure 13:
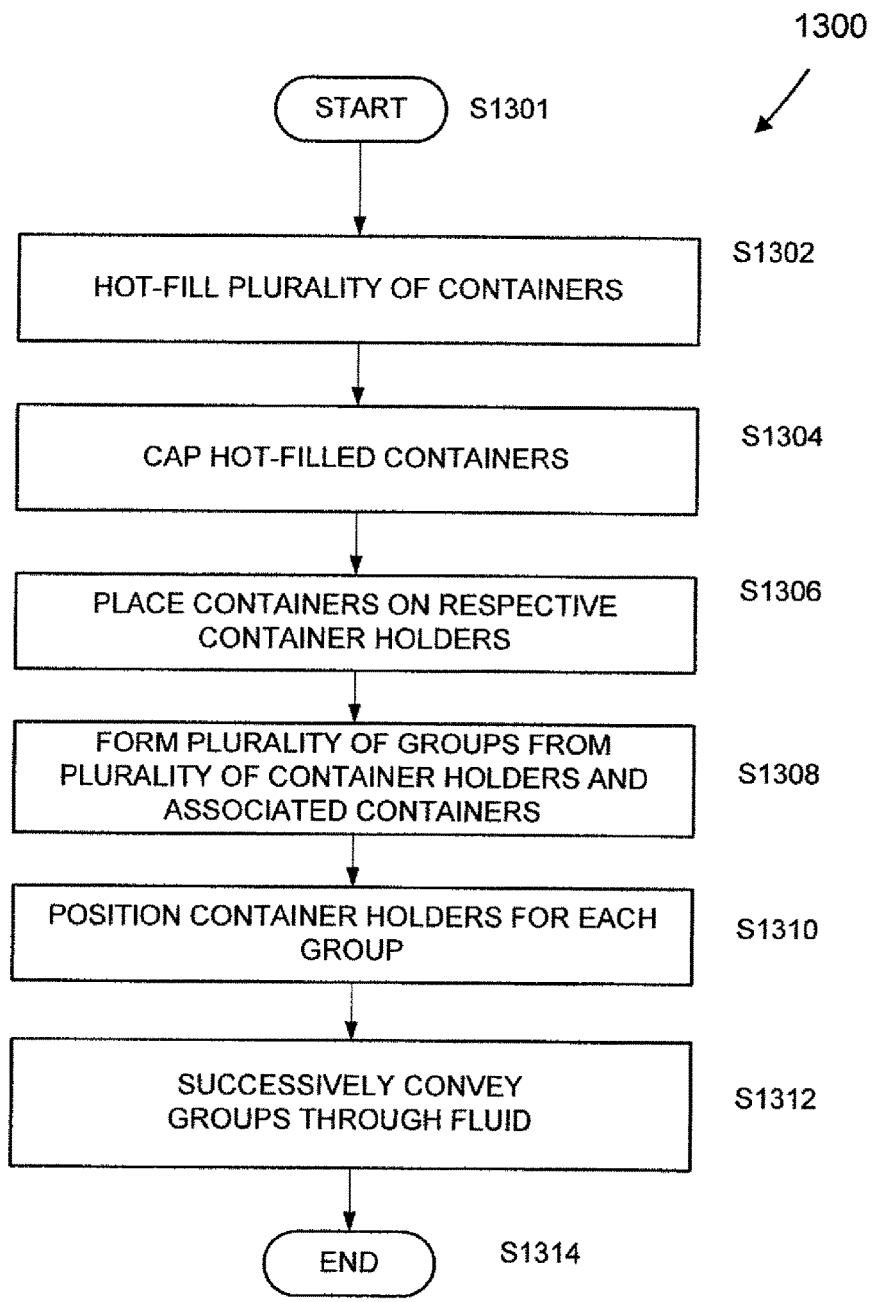
FIG. 13 is a flow chart of a method according to various embodiments of the disclosed subject matter.

FIGS. 12 and 13 show flow charts for methods according to various embodiments of the disclosed subject matter.

When hot-filled containers are touching each other during processing, the rate of cooling for the hot-filled product may not be as high as the rate of cooling for containers that are spaced apart from other hot-filled containers. Therefore, more time may be required to cool hot-filled containers when they are touching other hot-filled containers than when the hot-filled containers are spaced apart. For example, a thin walled plastic container being spaced part from other containers may have increased cooling convection as adjacent containers' heat radiation does not affect that container's convention as much as when the containers are placed touching each other.

The spacing apart of containers using container holders may improve cooling efficiency and rate of cooling over instances where no container holder is used. Increased cooling efficiency and rate of cooling can decrease the time to cool hot-filled containers, thereby speeding up this portion of production. For example, a container not in a container holder or not otherwise spaced apart from one or more other containers, may take more time to decrease from about 185 degrees Fahrenheit to about 100 degrees Fahrenheit than containers in container holders. For example, containers not in container holders may take about 20 minutes in a cooling apparatus to decrease from about 185 degrees Fahrenheit to about 100 degrees Fahrenheit. In contrast, containers in container holders can take between about fourteen to about eighteen minutes in the cooling apparatus to decrease from about 185 degrees Fahrenheit to about 100 degrees Fahrenheit.

FIG. 12 shows a method according to various embodiments of the disclosed subject matter. The method may start at S1201 and continue to S1202. At S1202, a plurality of containers, of any suitable configuration, may be hot-filled with a product. The containers can be filled by any suitable means, and the containers can be filled simultaneously or successively. The product can be any suitable product, including, but not limited to, tea, caffeinated beverages, soft drinks, sports drinks, juice drinks, water, etc. Moreover, the product can be filled at any suitable temperature. In various embodiments, the product can be filled at about 185 degrees Fahrenheit.

After S1202, the method can proceed to S1204, where the hot-filled container can be sealed with a cap or a lid, for example. The sealing can be done by any suitable apparatus and by any suitable means known in the art. For example, the containers can be capped simultaneously or successively.

After S1204, the method may proceed to S1206. At S1206, a plurality of containers are placed in respective container holders, such as those shown and described herein. In various embodiments, the containers can be placed on base portions of the container holders. Also, although FIG. 12 shows S1206 occurring after S1202 and S1204, the placement of the containers in container holders can occur before hot-filling and capping, or between the hot-filling and the capping operations.

After S1206, the method may proceed to S1208. At S1208, container holders having respective containers placed thereon or therein can be positioned such that each of the container holders is in contact with any suitable number of other container holders. In their respective container holders, each of the containers is in a spaced-apart relationship with all of the other containers in their respective container holder.

The container holders can be positioned at any suitable point in the method. For example, even though FIG. 12 shows S1208 occurring after steps S1202-S1206, the container holders can be positioned before placing the containers thereon. In various embodiments, the containers placed on respective container holders at S1208 can be hot-filled and capped. Additionally, the container holders, with or without containers, may be accumulated or positioned on a conveyor for transport to a next operation in the production line. The container holders may be positioned or arranged on a conveyor or other transport means in any suitable configuration, such as in a single file line, either touching or slightly apart.

The method may then proceed to S1210. At S1210, the accumulated and/or positioned containers in their respective container holders can be cooled by any suitable cooling means. In various embodiments the product in the containers can be cooled from a hot state to a warm state. Moreover, at least one of the hot state and the warm state may be predetermined. The respective hot and warm states can be any suitable state. For example, the hot state may be about 185 degrees Fahrenheit and the warm state may be about 100 degrees Fahrenheit.

As noted above, the product may be cooled from the hot state to a warm state by any suitable means. In various embodiments, the containers and associated container holders may be passed through, for example, a tunnel in which a fluid, such as water, may be sprayed in a shower-like fashion to cool the container to a warm state. The fluid can be at any suitable temperature for cooling the product in the container 200. For example, the fluid can be at room temperature. As another example, the fluid can be at a temperature colder than room temperature. Generally, in this context, about 90 degrees Fahrenheit to about 100 degrees Fahrenheit may be characterized as "room temperature." However, room temperature is not limited to being at or between the aforementioned temperatures, and can be any suitable temperature designated as room temperature. Moreover, a temperature lower than room temperature may be, for example, about 65 degrees Fahrenheit to about 75 degrees Fahrenheit. Like room temperature above, the temperature below room temperature can be any suitable temperature designated as below room temperature.

Fluid, such as water may be supplied to cool the hot-product in the container from any suitable direction to the container, including, but not limited to, the top only, both the top and bottom, the side, or any combination thereof. In various embodiments, the water can be applied in the form of a rain shower. Water that is supplied to the container to cool the hot-filled product can exit in the container holder in any suitable way. In various embodiments, fluid, such as water, may exit through sidewall apertures, and/or through an open end of the base portion of the container.

The cooling can last for any suitable period. For example, in various embodiments, the time period for cooling the hot-filled product from the hot state to a warm state is about fourteen minutes to about eighteen minutes. As another example, in various embodiments, the time period for subjecting the containers to fluid such that the product is cooled from a hot state to a cool state may be no more than about eighteen minutes.

The temperature of the containers and/or products in the containers can be measured by any suitable means and at any suitable position or positions. For example, a temperature probe or probes can be utilized to measure the temperature at one or more containers.

Cooling the product may create a vacuum in the container, and the method may proceed to S1212.

As S1212, a bottom end portion of the container can be moved or caused to move to compensate for the vacuum in the container. For example, the bottom end portion may move or be drawn inward by the force of the vacuum itself. Optionally or alternatively, a mechanical apparatus, such as a push rod may extend through the bottom open end of the container holder to move the bottom end portion of the container. In various embodiments, the bottom end portion may be inverted to compensate for the internal vacuum. In various embodiments the container can have a projection, and the projection can extend into or through a base portion on the container holder, but not such that it extends beyond the bottom opening of the container holder. The projection can be moved, for example, inverted, in order to compensate for the vacuum in the container. Vacuum compensation by moving or movement of the bottom end portion can include reduce the vacuum within the container, eliminating the vacuum within the container, or creating an overpressure in the container.

After S1212, the method may proceed to any suitable operation. For example, the method may proceed to S1214 where the method ends. Note that further processing of the container and/or container holder can occur, such as separation of the container from the container holder.

The method of FIG. 13 will now be described. The method may begin at S1301 and proceed through steps S1302, S1304, and S1306. The aforementioned steps can be substantially as described above with respect to steps S1202, S1204, and S1206 of FIG. 12 and will not be described again. The method may then proceed to S1308. At S1308, groups of container holders and associated containers can be formed. Any suitable number of groups can be formed and any suitable number of container holders and associated containers can form each group. For example, seven container holders and associated containers can form each group. The method may then proceed to S1310.

At S1310, the container holders and associated containers can be positioned or arranged. The container holders and associated containers can be positioned or arranged in any suitable configuration. For example, the container holders and associated containers can be positioned as shown in FIG. 14.

Figure 14:
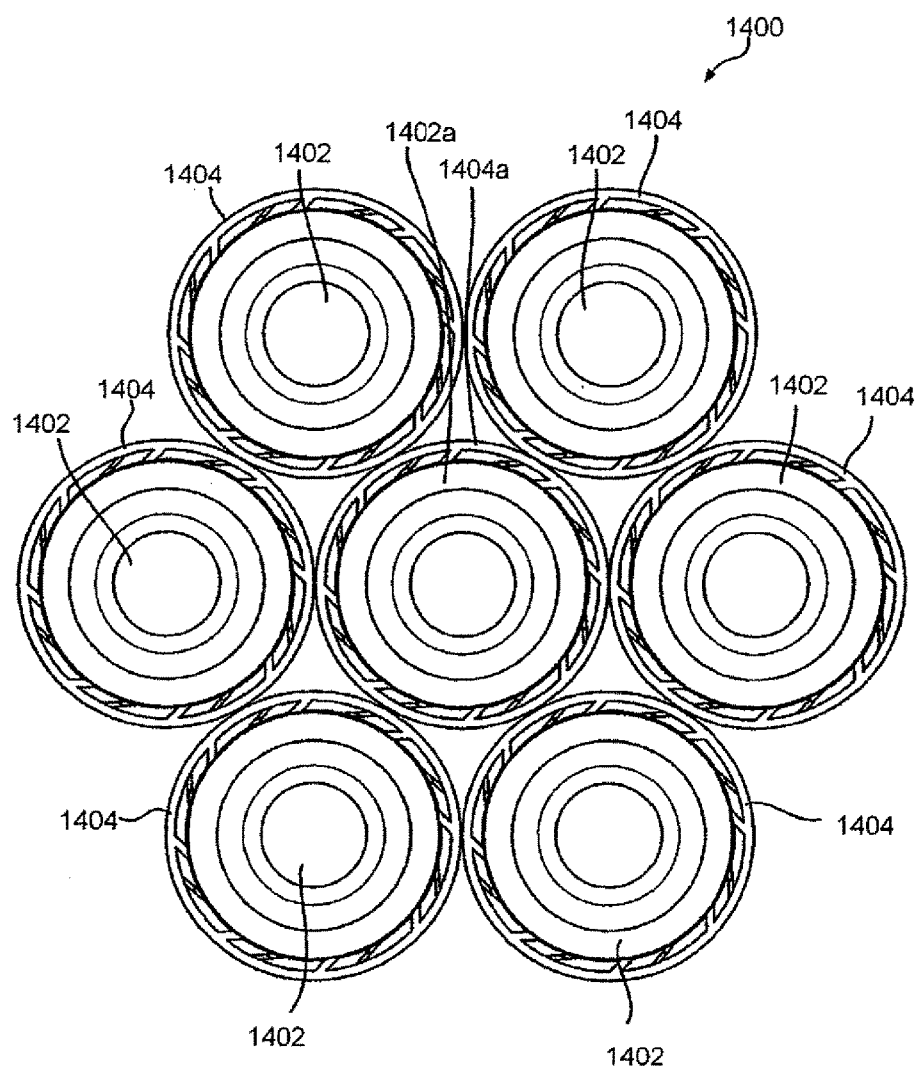
FIG. 14 is an overhead view of a grouping of container holders and corresponding containers according to various embodiments of the disclosed subject matter.

FIG. 14 shows an overhead view of a positioning of a group 1400 of containers 1402 such that each container 1402 is spaced-apart from all of the other containers. The means by which the containers 1402 can be spaced-apart from each other may be container holders 1404. In various embodiments, the container holders 1404 can be the same as or substantially the same as described above with respect to FIGS. 1-5. Alternatively, the container holders 1404 can be the same as or substantially the same as described above with respect to FIGS. 6-11.

As can be seen in FIG. 14, a container holder 1404 can be associated with each container 1402, with each container holder 1404 being configured to receive one container 1402 positioned thereon. The container holders 1404 and associated containers 1402 can be of any suitable number and can be accumulated or positioned in any suitable configuration. For example, FIG. 14 shows seven container holders 1404 and associated containers 1402, wherein the configuration can include a center container holder 1404a (and associated container 1402a) surrounded by, and in contact with, six container holder/container combinations 1404/1402. In various embodiments, only the container holders 1404 are in contact with other container holders 1404. For example, each of the container holders 1404 surrounding the center container holder 1404a can be in contact with at least three of the other container holders 1404, including the center container holder 1404a. In addition, in various embodiments, the container holders 1404 can be banded together by any suitable means, such as a band or bands of any suitable construction and material.

The method may then proceed to S1312. At S1312 the groups of container holders and associated containers and products therein can be cooled. In various embodiments, the product can be cooled from a hot state to a warm state, substantially as described above with respect to FIG. 12. The groups of containers can be cooled by any suitable means. In various embodiments, the groups of containers can be fed through a cooler, a fan, waterspray, or the like. Furthermore, the time period for cooling the product from a hot state to a warm state can substantially as described above for FIG. 12. For example, the time period for cooling from the hot state to the warm state may be about fourteen minutes to about eighteen minutes. Also similar to as described above for FIG. 12, conveying each group through the fluid may be for no longer than about eighteen minutes.

The method may then proceed to any suitable step. For example, the method may proceed to S1314 where the method ends. Alternatively, for example, the method may proceed to a step where movable portions of the containers are moved or caused to move in order to reduce respective vacuum in the containers. Movement of the container bottom end portions may occur substantially simultaneously or separately for each container. In various embodiments the containers may be rearranged, for example in a single file line, prior to moving or causing movement of the bottom end portion of the container.

Figure 15:
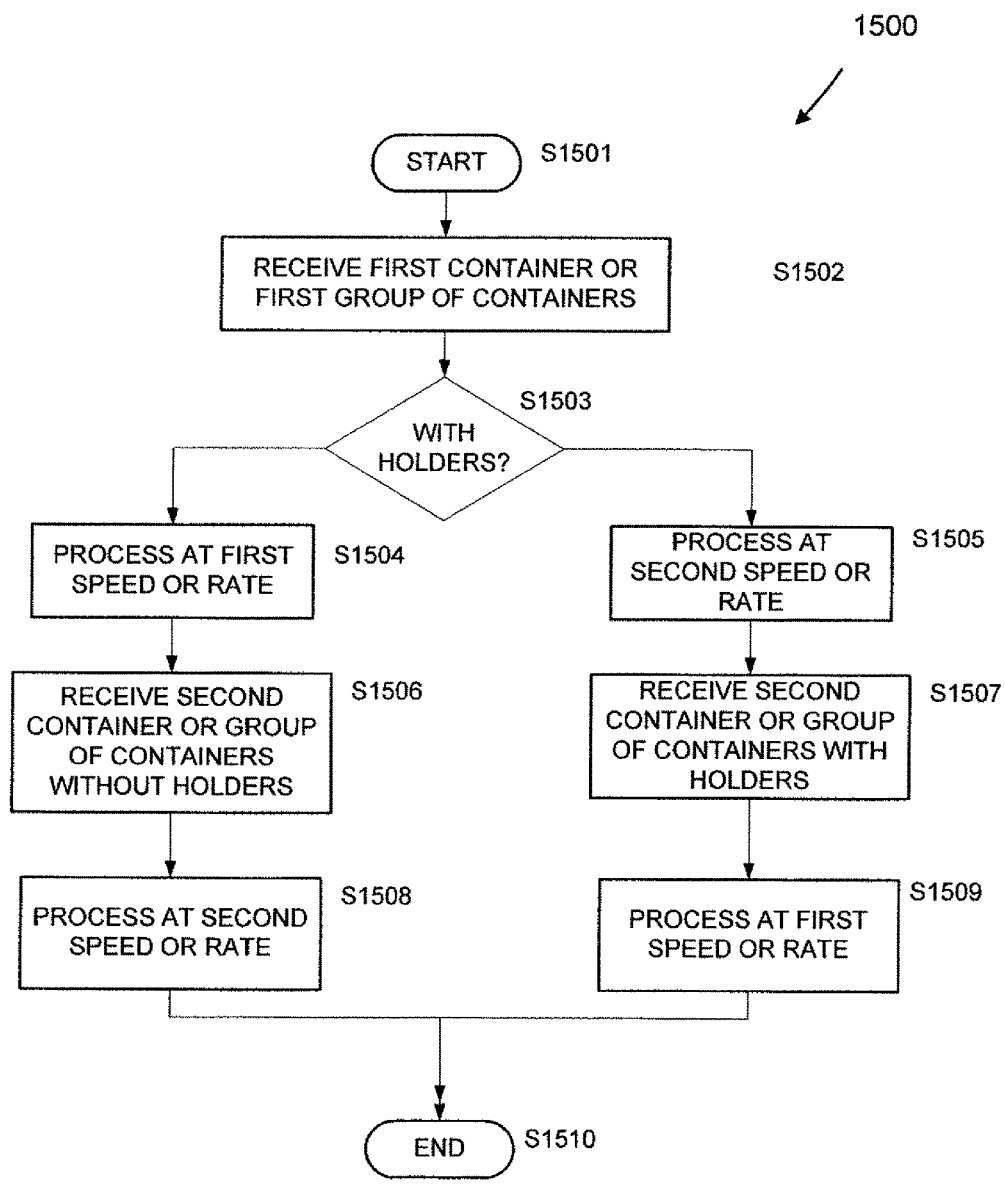
FIG. 15 is a flow chart for a method of processing containers at different speeds, depending upon whether or not container holders are implemented.

FIG. 15 is a flow chart for a method 1500 of processing containers at different speeds, depending upon whether or not container holders are used.

Hot-filled containers that are spaced apart may cool faster than hot-filled containers that are not spaced and are instead in direct contact with other hot-filled containers. Thus, when container holders are used to separate hot-filled containers the containers may cool faster than without container holders.

According to various embodiments of the disclosed subject matter, a method of cooling, using a cooling machine or apparatus that processes the containers as they cool, may be performed at different speeds when the containers are combined with container holders and when the containers are not combined with container holders, but are in contact with other containers. Thus, the same cooling machine or apparatus may be operated at different speeds for containers combined with container holders and for containers not combined with container holder. In various embodiments, the changeover between speeds can be performed automatically and autonomously, for example via a computerized system and sensors, based on detection of a change from processing of containers with container holders to containers without container holders and vice versa. Containers with holders and containers without holders can be arranged in any suitable sequence. For example, containers with holders and containers without holders may alternate successively. Alternatively, a group of containers with holders can be cooling-processed at a first speed and then a group of containers without holders can be cooling-processed at a second speed. In various embodiments, the speed of processing containers with holders can be greater than the speed of processing containers without holders. Thus, the cooling machine or apparatus may be operated at a faster processing rate with containers and holders versus containers without holders. Incidentally, cooling-processing, in addition to involving cooling of the container, can also involve compensating for vacuum forces within the container, such as movement (e.g., inversion) of a bottom end portion of each of the containers.

Referring specifically to FIG. 15, method 1500 can begin at S1501 and proceed to S1502, wherein a first container or a first group of containers is received. The first container or group of containers may or may not have corresponding container holders. So at S1503 it is determined whether the first container or first group of containers have container holders. Such determination can be performed continuously, automatically, and autonomously by a computerized system, for example. If yes at S1503, the method 1500 can proceed to S1504, wherein cooling processing (e.g., movement, vacuum compensation, etc.) of the first container or first group of containers can be performed at a first speed or rate. After S1504, the method can proceed to S1506 where a second container or group of containers without container holders is received. It is determined that the second container or group of containers do not have container holders and the method S1500 can cooling process (e.g., move, vacuum compensate, etc.) the second container or second group of containers at a second speed or rate at S1508. In various embodiments, the first speed or rate is faster than the second speed or rate. The method may proceed to S1510, or it may loop back continuously to S1501.

If no at S1503, the method 1500 can proceed to S1505, wherein cooling processing (e.g., movement, vacuum compensation, etc.) of the first container or first group of containers can be performed at a first speed or rate. After S1505, the method can proceed to S1507 where a second container or group of containers with container holders is received. It is determined that the second container or group of containers have container holders and the method S1500 can cooling process (e.g., move, vacuum compensate, etc.) the second container or second group of containers at a second speed or rate at S1509. In various embodiments, the second speed or rate is faster than the first speed or rate. The method may proceed to S1510, or it may loop back continuously to S1501.

While the disclosed subject matter has been described in conjunction with a number of embodiments, the disclosed subject matter is not to be limited to the description of the embodiments contained herein, but rather is defined by the claims appended hereto and their equivalents. It is further evident that many alternatives, modifications, and variations would be or are apparent to those of ordinary skill in the applicable arts. Accordingly, all such alternatives, modifications, equivalents, and variations that are within the spirit and scope of this disclosed subject matter.

What is claimed is:

1. A system for processing plastic containers, comprising:
   a hot-filling station to hot-fill a plurality of plastic containers with a product;
   a capping station to cap the hot-filled plastic containers; and
   a cooling station to cool the plurality of hot-filled and capped plastic containers from a hot state to a predetermined warm state, each of the plastic containers being positioned in a respective container holder,
   wherein each of said container holders includes:
   at least one sidewall forming an inner volume, a first open end, and a second open end, the at least one sidewall including at least one opening defined therein to allow fluid to transfer between the inner volume and outside the inner volume;

a support structure to support a plastic container positioned thereon, the support structure being formed in one piece with the at least one sidewall at the second open end, so as to extend from the at least one sidewall into the inner volume; and spacing members formed in one piece with the sidewall to space apart from the at least one sidewall the plastic container placed in the inner volume, wherein each spacing member is formed as a fin and includes an upper portion, a bottom portion, and at least one horizontally-extending protruding portion formed between and spaced from the upper portion and the bottom portion, wherein the at least one horizontally-extending protruding portion is facing the support structure and is configured to prevent a container placed in the inner volume from being removed from the inner volume.

2. The system according to claim 1, wherein the hot state is about 185 degrees Fahrenheit and the predetermined warm state is about 100 degrees Fahrenheit.

3. The system of claim 1, wherein a time period for the hot-filled and capped plastic containers to cool from the hot state to the predetermined warm state is about fourteen minutes to about eighteen minutes.

4. The system of claim 1, wherein said cooling station subjects the hot-filled and capped plastic containers to at least one of room temperature water or water cooler than room temperature.

5. The system of claim 4, wherein said cooling station subjects the hot-filled and capped plastic containers to room temperature water for no more than about eighteen minutes.

6. The system of claim 1, wherein the at least one opening is configured to allow water to flow from the inner volume to the outside of the sidewall to assist in the cooling.

7. The system of claim 1, wherein the at least one opening is located intermediate the first and second open ends, and wherein the at least one opening is configured to allow water to flow from the inner volume to the outside of the sidewall to cool a container placed in the inner volume on the support structure.

8. The system of claim 1, wherein the horizontally-extending protruding portion comprises at least one horizontally-extending engagement surface, with an upper vertically-configured portion defined between the horizontally-extending engagement surface and the upper portion, and a lower vertically-configured portion defined between the horizontally-extending engagement surface and the bottom portion, wherein the at least one horizontally-extending engagement surface is facing the support structure.

9. The system of claim 8, wherein said at least one horizontally-extending engagement surface is formed by a cut-away portion extending from the bottom portion to the engagement surface of each said spacing member, and wherein the spacing members are formed by a vertically-extending protruding portion.

10. The system of claim 8, wherein the upper portion of each said spacing member includes a sloped portion, and wherein the sloped portion is arcuate.

11. The system of claim 1, further comprising a placing station to place the plastic containers on respective container holders for holding the plastic containers.

12. The system of claim 1, further comprising a positioning station to position said container holders having respective hot-filled and capped plastic containers placed thereon, such that each said container holder is in contact with at least three other of said container holders, and such that each hot-filled and capped plastic container is in a spaced-apart relationship with all other of the positioned hot-filled and capped plastic containers.

13. A system for processing plastic containers, comprising:

a hot-filling station to hot-fill a plurality of plastic containers with a product;

a capping station to cap the hot-filled plastic containers; and a cooling station to cool the plurality of hot-filled and capped plastic containers from a hot state to a predetermined warm state, each of the plastic containers being positioned in a container holder, wherein each of said container holders includes:

at least one sidewall forming an inner volume, a first open end, and a second open end, the at least one sidewall including at least one opening defined therein to allow fluid to transfer between the inner volume and outside the inner volume;

a support structure to support a plastic container positioned thereon, the support structure being formed in one piece with the at least one sidewall at the second open end, so as to extend from the at least one sidewall into the inner volume; and spacing members formed in one piece with the sidewall to space apart from the at least one sidewall the plastic container placed in the inner volume, wherein the spacing members include an upper portion, a bottom portion, and at least one horizontally-extending engagement surface formed between and spaced from the upper portion and the bottom portion with an upper vertically-configured portion defined between the horizontally-extending engagement surface and the upper portion, and a lower vertically-configured portion defined between the horizontally-extending engagement surface and the bottom portion, wherein the at least one horizontally-extending engagement surface extends at a right angle with respect to the lower vertically-configured portion and is configured to prevent a container placed in the inner volume from being removed from the inner volume.

* * * * *